United States Patent Office 3,048,467
Patented Aug. 7, 1962

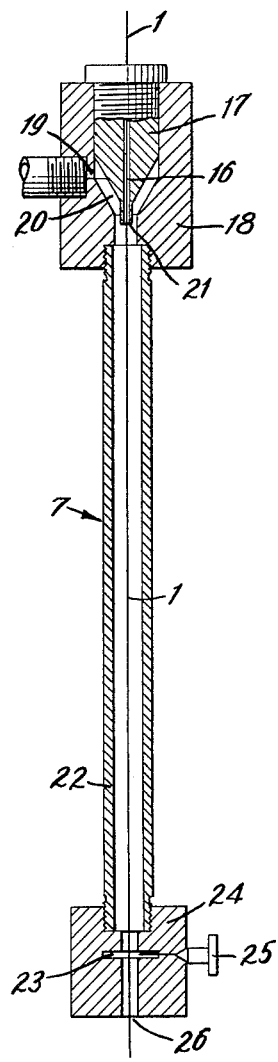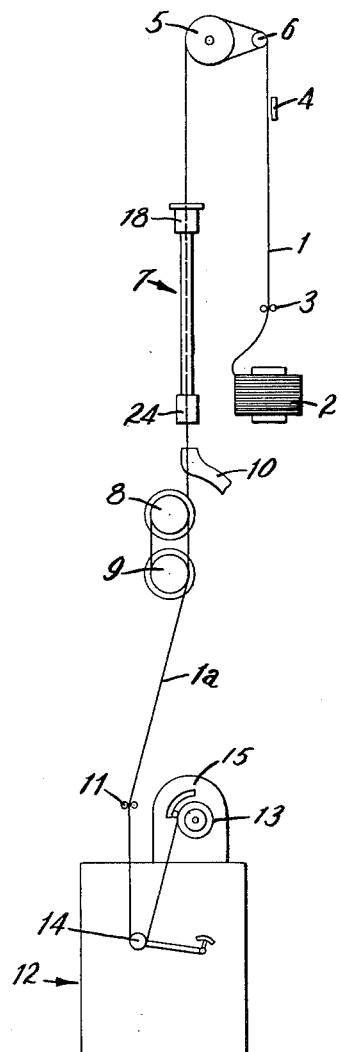
Fig. 2.
Fig. 1.
INVENTORS
ANDREW T. WALTER
JOHN S. ROBERTS
BY Francis M. Fazio
ATTORNEY

3,048,467
TEXTILE FIBERS OF POLYOLEFINS
John S. Roberts, South Charleston, and Andrew T. Walter, Charleston, W. Va., assignors to Union Carbide Corporation, a corporation of New York
Filed Sept. 15, 1959, Ser. No. 840,499
4 Claims. (Cl. 18—54)

This invention relates to novel polyolefin textile fibers. More particularly it relates to novel low denier per filament multifilament yarns of certain olefin polymers and to a method of preparing the same. This application is a continuation-in-part of Serial No. 665,368, filed June 10, 1957, now abandoned.

Heretofore it has been suggested to form monofils and multifilament yarns by melt spinning polyethylene. However, it has not heretofore been shown that low denier per filament multifilament polyethylene or polypropylene yarns can be produced having the desirable tenacity, elongation, and stiffness properties so essential in fibers suitable for the manufacture of textile fabrics.

It has now been discovered that multifilament low denier per filament polyethylene and polypropylene yarns can be produced at high commercially practicable winding speeds from certain high density olefin resins, which fibers are characterized by high strength and toughness, desirable chemical resistance and abrasion resistance, very low moisture absorption, good electrical insulating characteristics, and other desirable properties as disclosed herein. Further, particular polyolefin textile fibers are prepared according to the practice of the present invention, in which such properties as density, melting temperature, resiliency, oxidation resistance, heat and light stability, bonding characteristics, denier, orientation, and hand can be selectively varied as desired for a particular use. The unusual combinations of physical properties that can be obtained in these aliphatic polyolefin multifilament fibers as well as the low cost of the olefin monomers used in their preparation result in a wide range of industrial, household and apparel applications, such as, for example, in weather and mildew resistant tarpaulin, tents and bags, upholstery, carpets, draperies, sheets, blankets, suiting, gloves, socks, underwear and the like. Polyethylene fibers prepared by our process are of particular utility in non-woven materials such as paper, batting, felt, and the like, due to their excellent self-bonding qualities, as well as manifesting superior stability to high temperature oxidation and resistance to abrasion and chemical and bacteriological attack.

The present invention involves, therefore, a method for preparing low denier per filament multifilament yarns. This can be accomplished by the process of this invention by the use of high density polyethylene and polypropylene resins having the following properties:

| Resin | Polyethylene | Polypropylene |
|---|---|---|
| Density, g./cc | at least about 0.945 | at least about 0.90. |
| Melt Index, dgm./min | about 6 to 20 | about 1 to 100. |
| Flow Rate to Melt Index, Ratio. | 15:1 to 20:1 | 15:1 to 40:1. |

While all resins having the above-indicated properties can be used in the process of this invention, it has been found that those resins having the following properties are preferred:

| Resin | Polyethylene | Polypropylene |
|---|---|---|
| Density, g./cc | about 0.95 to 0.97 | about 0.900 to 0.925. |
| Melt Index, dgm./min | about 8 to 15 | about 2 to 25. |

The resins suitable for the production of low denier per filament multifilament yarns have narrowly critical melt index and density ranges, and when one considers the many types of such resins that are produced with melt indices as low as zero and as high as 10,000 dgm./min. and densities much below those found suitable for producing the fine denier filament, it was unexpected, and unobvious that filamentous yarns could be produced only from such a restricted and critical group of resins.

The process of this invention comprise sequentially melting and extruding the molten polyolefin resin through a multi-orifice spinnerette at a constant rate and temperature and subsequently melt drawing and simultaneously cooling the molten filamentous extrudate. The term "melt drawing" signifies an extenuation of the molten multifilament yarn as it comes out of the spinnerette, and is carried out at a temperature above that of the first order transition temperature of the resin. The degree of melt draw imparted to the multifilament yarn is dependent on the orifice size and rate of extrusion; nevertheless sufficient melt draw must be imparted so that the stretching which follows will produce filaments of desired fine denier. After the melt draw and cooling operations have been completed the solidified multifilament yarn is stretched at least 200 percent to orient the molecules and produce filaments each measuring from about 1 to 15 denier. This "stretching" is an extenuation of the yarn at a temperature below the first order transition temperature of the resin; that is, below the melting point of the resin. The stretching however, is carried out at a temperature of at least 100° C. An atmosphere of steam is preferred during the stretching, and when working with polyethylene resins, it is necessary in order to produce satisfactory fibers.

As indicated, the preferred method of stretching the fiber is in steam since it is important that these fibers during the orientation process be heated in such manner as to avoid a high frictional drag upon the yarn and, most particularly, because of the markedly enhanced properties of the fibers so treated as well as the higher degree of stretch made possible thereby. An alternative method, although normally significantly less preferred for stretching the fibers of the present invention is by means of a heated snubbing pin or hot metal platen having a very slight curvature so that the yarn is contact heated without encountering excessive frictional resistance.

The use of steam in the stretching makes it possible to stretch the multifilament polyethylene yarns from about 500 percent to 1500 percent, and multifilament polypropylene yarns from about 400 percent to 700 percent with good continuity and without filament breakage. These degrees of stretching can be obtained at the high spinning speeds necessary for commercial value, and can only be achieved when the stretching operation is carried out in a steam atmosphere.

The maximum degree of stretch that can be obtained in steam without filament breakage cannot be definitely set forth since it is dependent upon the molecular weight of the polyolefin resin and upon the melt-spinning conditions employed. The latter effect indicates that a slight degree of orientation is actually imparted during melt-spinning, although not nearly enough to significantly effect the strength.

The stretched-oriented low denier per filament multifilament textile fibers of polyethylene so obtained are characterized by having an elongation at break of no more than 40 percent and normally not less than 10 percent, stiffness values of 30 to 100 grams per denier (g.p.d.), tenacity of at least 3 g.p.d. and preferably from about 4 to 7 g.p.d., and a stability to sunlight of about 40 hours to 100 hours. Polyethylenes having lower melt indices than herein specified can also be employed but, however, have very limited commercial feasibility due to poor spinnability of the fiber. Further, the polyethylene fibers can be oriented to higher tenacity and stiffness but to do so is commercially unattractive because of the reduced stretching speeds necessary.

The stretched-oriented low denier per filament multifilament textile fibers of polypropylene so obtained are characterized by having an elongation at break of no more than 50 percent and normally not less than 15 percent, stiffness values of 30 to 80 g.p.d., tenacity of at least 3 g.p.d. and preferably from about 4 to 7 g.p.d., and a stability to sunlight of at least 20 hours.

Insofar as has been determined, no sign of resin degradation has been evident during the melt drawing and stretching steps.

The olefin polymers employed for the preparation the low denier per filament multifilament yarns herein are the polyethylenes and polypropylenes characterized as described above. These high molecular weight, substantially crystalline aliphatic olefin polymers have melting temperatures in excess of 100° C. and can be produced, illustratively, by forming a mixture of ethylene or propylene monomer and a catalyst composition composed of titanium trichloride or titanium tetrachloride and most desirably a trialkyl aluminum wherein each of said alkyl substituents contains preferably 1 to 12 carbon atoms such as, for example, triisobutyl aluminum, triisopropyl aluminum, trioctyl aluminum and tridodecyl aluminum together with optionally an oxygen containing derivative thereof, such as, for example, triisopropoxide aluminum, and heating said mixture to a temperature preferably between 0° C. and 120° C. Inert hydrocarbon diluents such as, for example, benzene, toluene, xylene, methylcyclohexane, cyclohexane, hexane, heptane or highly purified kerosene, can optionally be employed, and the proportions thereof are not critical. The molecular ratio of aluminum containing component to titanium when titanium trichloride is employed is usually in the range of about 1 to 10 moles and preferably 1 to 3 mole aluminum to 1 mole of titanium trichloride. Where titanium tetrachloride is used as cocatalyst the molecular ratio is usually in the range of 1 to 10 moles and preferably 2 to 5 moles of aluminum containing component to 1 mole of titanium tetrachloride.

Ethylene polymers having the desired characteristics for use herein can also be polymerized with a chromium oxide catalyst on a silica alumina support in a suitable solvent or diluent according to the process disclosed in Belgian Patent 530,617. The polymerization of polypropylene for use in our process is further described in Belgian Patent 538,782.

In producing the low denier per filament multifilament yarns by the process of this invention the polymer is melted and extruded through a multi-orifice spinnerette by conventional and well known procedures. For example, a spinnerette having orifices from 0.015 inch to 0.05 inch, preferably from 0.02 inch to 0.04 inch, with a length to diameter ratio of the orifices of from about 1:1 to 20:1, preferably from 5:1 to 10:1, can be used. The resins are spun at temperatures of from about 200° C. to 320° C., for polyethylene, and from about 225° C. to 300° C. for polypropylene at an orifice velocity, or rate, of from about 3 to 50 feet per minute, preferably from about 10 to 40 feet per minute.

As the molten resin in multifilament yarn form leaves the spinnerette it is immediately melt drawn while it is passing through the cooling tower before it solidifies, and if desired treated with conventional sizing or lubricating agents.

While the molten filaments can be cooled by a variety of methods prior to collection, radiant or convection cooling with air is a preferred method, due to the relative ease at which this type of cooling can be accomplished. Air cooling can be performed successfully by either cross- current, concurrent or countercurrent flow of air about the molten filament bundle. Of these various cooling methods, the concurrent flow of cooling air is the most attractive, as turbulence in the filament bundle is at a minimum when this type of cooling is employed; and since air is neither directed against or across the spinning assembly a more precise control of spinnerette temperature can be maintained. With this type of cooling the filaments can be readily chilled from high spinning temperatures to a temperature of 60° C. or less. Filaments which have been cooled to 60° C. have adequate strength and resiliency to be easily handled on conventional winding equipment.

The melt draw ratio (the ratio of the speed of the cooled yarn at winding to the orifice velocity) can vary from about 15:1 to about 250:1 for polyethylene, and from about 15:1 to about 2500:1 for polypropylene. The melt draw ratio obtainable for a particular resin is dependent on the melt index and the flow rate to melt index ratio of the resin; and suitable low denier per filament multifilament yarns can be produced only from those resins having the critical properties defined above. Resins having melt indices below those specified above will not melt draw satisfactorily since such high molecular weight resins cannot be melt drawn sufficiently without breaking. The resins having higher melt indices than specified, however, will either break during melt drawing or the strength and toughness of the finished multifilament fibers are too low to be of interest.

The multifilament yarn obtained during the melt drawing operation possesses minimal orientation and has limited utility because of its relatively low strength and high elongation (300%). This yarn must be subjected to a stretching process to obtain adequate orientation for the achievement of useful textile properties. The rapid orientation of the spun filaments is most effectively accomplished in a fluid medium having a high heat transfer potential and offering a minimum drag to the heated filaments, i.e., steam. As the rate of the transfer decreases, or the imparted rate of draw increases, the maximum obtainable orientation is reduced. The multifilament yarns are easily stretched without filament breakage to from 3 to about 16 times their melt drawn length in the case of polyethylene and from 3 to about 8 times for polypropylene while passing through a steam chamber maintained at a steam pressure between about 5 and 25 p.s.i When the conventional stretching aids, such as a snubbing pin or heated platen, are employed, polyethylene yarns having tenacities of from 2 to 3 g.p.d. and elongations greater than 40 percent are obtained. However, with the use of steam, low denier per filament multifilament yarns are consistently prepared having tenacities in the 4 to 5 g.pd. range or above, and elongations between about 15 and 35 percent.

The amount of stretch needed to develop maximum strength will vary with the composition of the polymer and with the amount of preorientation that has been introduced during spinning. The actual attainment of the desired degree of stretch is effected by the temperature and speed of stretching and by the temperature of the fiber. The optimum temperature as described hereinabove is at least 100° C. but below the melting point of the polymer. The broad and preferred limits for stretching each of the polyolefin yarns is as follows:

| Composition | Broad Range | Preferred Range | Stretched Yarn Speed, Ft./min., Preferred Range |
| --- | --- | --- | --- |
| Polyethylene | 100–125 | 115–123 | 500–2,000 |
| Polypropylene | 105–130 | 115–125 | 500–2,000 |

The finished, stretched yarn may be twisted, plied, cut into staple fiber, or processed in any conventional manner customary for textile fibers.

It should again be noted that while the heat applied at any time to the polymers employed herein either prior to or during the extrusion, melt drawing and stretching steps is sufficient to cause the softening thereof for the purpose of forming filaments, it is insufficient to effect substantial or significant change in the melt index or density thereof.

The accompanying drawings illustrate a preferred process for stretching and producing the filaments and multifilament yarns of our invention. FIGURE 1 is a semidiagrammatic representation of the stretching operation. FIGURE 2 illustrates the details of a preferred steam stretching tube employed in orienting the polyolefin multifilament yarns of our process.

With reference to FIGURE 1, a schematic illustration of the steam stretching or drawing operation is depicted. The multifilament yarn 1 is withdrawn from the spun (or melt drawn) yarn package 2 through a guide 3 located above the yarn package 2. From the guide 3, the yarn is fed through a tension device 4, such as a tension gate, and to a godet, which is comprised of a driven roll 5 and an idler or separator roll 6 that is set about 5° askew of the driven roll 5. Four to five laps of yarn 1 are taken around this godet and the yarn 1 is then fed into a steam tube 7 located below the upper godet and extending to a bottom godet, which is comprised of two driven rolls 8 and 9, one of which is set about 5° askew of the other. This bottom godet 8 and 9 is always run faster than the top godet 5 and 6 so that the drawing of the yarn is accomplished in the stream tube 7. To collect the excess steam discharged from the stretching tube 7, an exhaust duct 10 is located below the stretching tube. The stretched low denier per filament multifilament yarn 1a is fed from the bottom godet 8 and 9 through a guide 11 and thence to a constant tension winder 12. The tension at which the yarn is wound on the stretched yarn package 13 is governed by a dancing roll 14, which regulates the torque capacity of the motor (not shown) driving the spindle (not shown) upon which the stretched yarn package 13 is supported. The stretched yarn 1a is traversed on the stretched yarn package 13 by a reciprocating guide (not shown) located in the pressure bale 15 of the winder 12.

With reference to FIGURE 2 a detailed drawing of a suitable steam-stretching tube is presented. The multifilament yarn 1 is introduced to the stretching tube 7 through an orifice 16, which can range in size from .030 inch to 0.60 inch in diameter, located in a plug 17, which is threaded into the top body 18 of the stretching tube assembly 7. The steam is introduced through a side port 19, located in the top body 18 and fed into a steam chest 20 which is formed by the inside wall of the top body 18 and the bottom of the insert plug 17. The steam when it emerges from the steam chest first contacts the yarn 1 when it issues from a nozzle 21 formed by the end of the top plug 17. Inserted into the bottom of the top body 18 is a length of tubing 22 through which the yarn 1 and steam travel to an adjustable orifice 23 located in a bottom body 24 which is affixed to the bottom of the tubing 22. This orifice 23 is adjusted by movement of a handle 25 which is affixed to one of the plates which comprise the adjustable orifice 23, so as to slide this plate over a passage located in the fixed plate of the orifice 23. By adjustment of this orifice the quantity of steam consumed can be regulated. Also by opening this orifice sufficiently, an adequate stem flow can be obtained to draw the yarn and the small quantity of steam which passes the orifice are conveyed away from the stretching tube through a small passage 26 in the bottom body 24. The effective length of a steam tube is measured from the point where the steam first contacts the yarn to the exit orifice plate.

The following examples are further illustrative of the invention:

Example 1

Polyethylene resin was prepared by the following procedure:

An autoclave equipped with an anchor type agitator operating at 107 r.p.m. was charged with 838 parts of kerosene (Bayol–D), 7.7 parts of aluminum trioctyl and 4.21 parts of titanium tetrachloride. The autoclave was maintained at a temperature of 27° C. ±5° C. and 100 parts of ethylene was admitted over a period of four hours while maintaining the autoclave pressure at 52 p.s.i. At the end of eight hours, isopropanol was added to inactivate the catalyst. The product was separated by filtration, washed with isopropanol and then with deionized water with centrifugation between washes and dried at 65° C. in a circulating-air oven.

This polyethylene resin X–Lab Code had a melt index of 8.8 dgm./min. and a specific gravity of 0.95 g./cc. and was vacuum dried for 80 hours at 140° C., to remove all traces of volatile material. It was then charged to a plunger-type melt extruder. The extruder was equipped with a 1.5-inch diameter spinnerette having thirty 0.015-inch diameter holes. A filter pack constructed from ½-inch of 80-mesh sand and three 325 mesh stainless steel screens was situated just prior to the spinnerette. The entire assembly: extruder, filter pack, and spinnerette, was heated to a temperature of 280° C., and the plunger travel of the extruder was adjusted to force the molten polymer through the spinnerette at a rate of 3 feet per minute. The molten multifilament extrudate was conducted downward through a countercurrent nitrogen atmosphere, produced by supplying nitrogen to a four-inch annular ring located one foot below the spinnerette face. The annular ring consisted of a one-quarter inch copper tubing drilled in such a manner as to direct the nitrogen upward and towards the center of the ring. The fibers, chilled by the nitrogen stream, were collected at a speed of 70 feet per minute.

The melt drawn, unoriented fiber was then stretched and by passing it through a steam tube located between a set of feed rolls and stretch rolls. The steam tube consisted of an 18-inch section of a ⅛-inch pipe restricted at each end to allow free passage of the yarn through the tube and to prevent excessive loss of steam. Steam was introduced to the tube through a side inlet so as to maintain 10 p.s.i.g. steam pressure in the tube. The yarn was fed to the stretching zone at a rate of 18 ft./min. and was stretched 1440 percent (take-up speed of 277 ft./min.) with good continuity of operation.

By way of contrast, another sample of unoriented yarn prepared from the same resin and melt drawn in the same manner, except that it was taken up at 140 ft./min. could not be stretched more than 500 percent without frequent breakage when a conventional "snubbing pin" heated to 80° C. was used. The snubbing pin could not be used at temperatures above about 80° C. The surprising improvement in mechanical properties of the yarn that was achieved by steam stretching is illustrated by the following table:

|  | Yarn Stretched in Steam at 110° C. | Yarn Stretched Around a ⅜-inch Diameter Pin at 80° C. |
|---|---|---|
| Yarn denier | 60 | 75.0 |
| Denier per filament | 2 | 2.5 |
| Tenacity, grams per denier | 6.8 | 2.9 |
| Elongation, percent | 10.0 | 56.0 |
| Shrinkage, percent in: |  |  |
| Boiling water | 6.5 | 13.0 |
| Air at 115° C | 11.0 | 31.5 |
| Maximum percent stretch attainable | 1,440.0 | 500.0 |

A small sample of unoriented yarn prepared from the same resin and melt spun in the same manner as the steam-stretched sample described in the preceding table could be hand-stretched 400 percent in 30° C. air. The yarn oriented in this manner was found to have a tenacity of 2.9 g.p.d., an elongation of 44 percent, and a shrinkage in boiling water of 20 percent.

*Example 2*

A polyethylene resin having a melt index of 12.6 dgm./min., a flow rate of 168 dgm./min. and a density of 0.954 g./cc. was prepared using a process similar to that described in Example 1. This resin was melted in a conventional screw extruder and directed to a gear type pump maintained at the spinning temperature which metered the polymer through a sand filter pack and to a spinnerette containing 50 orifices, each 0.02 inch in diameter and 0.1875 inch long, arranged equally spaced on a 2.5 inch diameter circle. The extruded filaments were cooled by an air stream directed across the path of the yarn as it passed downward from the spinnerette to a winding device located approximately twelve feet below the spinnerette. The polymer was extruded through the orifices at a velocity of 15 f.p.m. at a temperature of 200° C. and the cooled yarn was wound up on a bobbin at a speed of 975 f.p.m. corresponding to a melt draw ratio of 65:1. The melt drawn, unoriented yarn was then stretched 400 percent by passing through a steam tube 10 inches long wherein the yarn was brought in contact with steam at 10 p.s.i.g. The length of the steam tube as referred to herein and throughout the specification refers to the effective length thereof as defined herein. The stretched, oriented yarn was wound up at a speed of 500 f.p.m. (feet per minute). The resulting 191-denier, 50-filament yarn had a tenacity of 4.32 g.p.d. and ultimate elongation of 12.4 percent and a stiffness of 44.5 g.p.d.

*Example 3*

A polypropylene resin was prepared as follows:

A water jacketed 100 gallon stainless steel lined autoclave was charged with 430 pounds of purified kerosene. Nitrogen was then passed through the system and vented to the atmosphere. Through the addition port propylene was fed continuously at a rate of 58–80 cu. ft. per hour (3–8 lbs./hr.). During the first hour of operation, a slurry of titanium trichloride in heptane and a solution of triisobutylaluminum in heptane was added. The total weight of titanium trichloride added was 0.22 lb. and that of triisobutyl aluminum was 1.1 lbs. (mol ratio of 1 to 4). The reaction was conducted for 11½ hours, and a reaction temperature and pressure of 120° C. and 90 p.s.i. respectively were maintained. At the end of the reaction, it was calculated by a total solids measurement that 45 pounds of resin had been produced. The reaction mixture was washed with water. The washed material was then charged to a 750 gallon autoclave where it was diluted with water at atmospheric temperature agitated and circulated for a period of 2 hours. The water layer was then drained off and heptane to which was added 0.5 percent or 50 grams of an antioxidant was added to the mixture. This slurry was then agitated and circulated for an additional ½ hour. This mixture was then centrifuged at atmospheric pressure and temperature under a nitrogen atmosphere. The centrifuged polypropylene was then spread out on trays in a 60° C. air circulating oven and dried until a total solids of 99.5 percent was obtained. This resin was milled on a 170° C. roll mill and chipped into particles of a convenient size for feeding to the hopper of an extruder. This chipped product had a melt index and flow rate 10.8 dgm./min. and 250.6 dg./min. respectively.

The above polypropylene resin was melted in a conventional screw extruder and directed to a gear pump maintained at the spinning temperature and which metered the polymer through a sand filter pack and to a spinnerette containing 50 orifices, each 0.02 inch in diameter and 0.1875 inch long, arranged equally spaced on a 2.5 inch diameter circle. The extruded filaments were simultaneously melt drawn and cooled as they passed downward through a tube with a concurrent flow of cooling air (at room temperature) to a winding device located approximately twelve feet below the spinnerette. The polypropylene resin was extruded through the orifices at a velocity of 15 f.p.m. at a temperature of 265° C. and the cooled yarn was wound up on a bobbin at a speed of 850 f.p.m. corresponding to a melt draw ratio of 57:1 and a rate of about 4 pounds per hour. The melt drawn, essentially unoriented multifilament yarn was then stretched 500 percent by passing through a steam tube 16 inches long wherein the yarn was brought in contact with steam at 11 p.s.i.g. The stretching tube was constricted at the ends to permit the entrance and exit of yarn without excessive loss of steam. The stretched, oriented multifilament yarn was wound up at a speed of 1050 f.p.m. The resulting 180-denier, 50-filament yarn had a tenacity of 4.72 g.p.d., and elongation at break of 25.6 percent and a stiffness of 44.5 g.p.d.

*Example 4*

A polypropylene resin was prepared by a polymerization process similar to that described in Example 3; except that in this case an eleven gallon glass lined autoclave was charged with heptane as a diluent. The resin produced by the above polymerization had a density of 0.9224.

This resin was milled on a 170° C. roll mill and chipped into particles of a convenient size for feeding the hopper of an extruder. This chipped product had a melt index and flow rate of 3.06 and 85 respectively.

The above polypropylene resin was melted in a conventional screw extruder and directed to a gear pump maintained at the spinning temperature which metered the polymer through a sand filter pack and to a spinnerette containing 50 orifices, each 0.02 inch in diameter and 0.1875 inch long, arranged equally spaced on a 2.5 inch diameter circle. The extruded filaments were simultaneously extenuated and cooled as they passed downward through a tube with a concurrent flow of cooling air (at room temperature) to a winding device located approximately twelve feet below the spinnerette. The polypropylene resin was extruded through the orifices at a velocity of 15 feet per minute at a temperature of 240° C. and the cooled melt drawn multifilament yarn was wound up on a bobbin at a speed of 1200 feet per minute corresponding to a melt draw ratio of 80:1 and a rate of about 4 pounds per hour. The melt drawn, essentially unoriented yarn was then stretched 313 percent by passing through a steam tube 16 inches long wherein the yarn was brought in contact with steam maintained at a pressure of 15 p.s.i.g. The stretching tube was constricted at the ends to permit the entrance and exit of yarn without excessive loss of steam. The stretched, oriented yarn was wound up at a speed of 950 f.p.m. The resulting 190-denier, 50-filament yarn had a tenacity of 4.51 g.p.d., and elongation at break of 30.2 percent and a stiffness of 43.9 g.p.d.

What is claimed is:

1. A process for producing multifilament low denier per filament polyethylene yarns which comprises the steps of sequentially melting polyethylene resin characterized by having a density of at least about 0.945 g./cc., a melt index of from about 6 to about 20 d.g.m./min., and a flow rate to melt index ratio of from about 15:1 to about 20:1; extruding said resin through a multi-orifice spinnerette at a temperature of from about 200° C. to about 320° C.; melt drawing the extruded filamentous resin from about 15 fold to about 250 fold at a temperature above the first order transition temperature of the resin while simultaneously cooling the molten filamentous extrudate; and finally stretching the solidified melt drawn multifilament yarn in a steam atmosphere at a temperature below the first order transition temperature of the resin to an extent of from about 500 percent to about 1500 percent at a steam temperature of from about 100° C. to about 125° C.; said multifilament low denier per filament polyethylene yarns having a tenacity of at least 3 g.p.d., a stiffness of from about 30 to 100 g.p.d., an elongation at break of from about 10 percent to about 40 percent, and the individual filaments thereof each measuring from about 1 to about 15 denier.

2. A process for producing multifilament low denier per filament polyethylene yarns which comprises the steps of sequentially melting polyethylene resin characterized by having a density of from about 0.95 to about 0.97 g./cc., a melt index of from about 8 to about 15 d.g.m./min., and a flow rate to melt index ratio of from about 15:1 to about 20:1; extruding said resin through a multi-orifice spinnerette at a temperature of from about 200° C. to about 320° C.; melt drawing the extruded filamentous resin from about 15 fold to about 250 fold at a temperature above the first order transition temperature of the resin while simultaneously cooling the molten filamentous extrudate; and finally stretching the solidified melt drawn multifilament yarn in a steam atmosphere at a temperature below the first order transition temperature of the resin to an extent of from about 500 percent to about 1500 percent at a steam temperature of from about 115° C. to about 123° C.; said multifilament low denier per filament polyethylene yarns having a tenacity of from about 4 to 7 g.p.d., a stiffness of from about 30 to 100 g.p.d., and the individual filaments thereof each measuring from about 1 to about 15 denier.

3. A process for producing multifilament low denier per filament polypropylene yarns which comprises the steps of sequentially melting polypropylene resin characterized by having a density of at least about 0.90 g./cc., a melt index of from about 1 to about 100 d.g.m./min., and a flow rate to melt index ratio of from about 15:1 to about 40:1; extruding said resin through a multi-orifice spinnerette at a temperature of from about 225° C. to about 300° C.; melt drawing the extruded filamentous resin from about 15 fold to about 2500 fold at a temperature above the first order transition temperature of the resin while simultaneously cooling the molten filamentous extrudate; and finally stretching the solidified melt drawn multifilament yarn in a steam atmosphere at a temperature below the first order transition temperature of the resin to an extent of from about 400 percent to about 700 percent at a steam temperature of from about 105° C. to about 130° C.; said multifilament low denier per filament polypropylene yarns having a tenacity of at least 3 g.p.d., a stiffness of from about 30 to 80 g.p.d., an elongation at break of from about 15 percent to about 50 percent, and the individual filaments thereof each measuring from about 1 to about 15 denier.

4. A process for producing multifilament low denier per filament polypropylene yarns which comprises the steps of sequentially melting polypropylene resin characterized by having a density of from about 0.900 to about 0.925 g./cc., a melt index of from about 2 to about 25 d.g.m./min., and a flow rate to melt index ratio of from about 15:1 to about 40:1; extruding said resin through a multi-orifice spinnerette at a temperature of from about 225° C. to about 300° C.; melt drawing the extruded filamentous resin from about 15 fold to about 2500 fold at a temperature above the first order transition temperature of the resin while simultaneously cooling the molten filamentous extrudate; and finally stretching the solidified melt drawn multifilament yarn in a steam atmosphere at a temperature below the first order transition temperature of the resin to an extent of from about 400 percent to about 700 percent at a steam temperature of from about 115° C. to about 125° C.; said multifilament low denier per filament polypropylene yarns having a tenacity of from about 4 to 7 g.p.d., a stiffness of from about 30 to 80 g.p.d., and the individual filaments thereof each measuring from about 1 to about 15 denier.

References Cited in the file of this patent

UNITED STATES PATENTS

| | | |
|---|---|---|
| 2,367,173 | Martin | Jan. 9, 1945 |
| 2,468,081 | Koster | Apr. 26, 1949 |
| 2,825,721 | Hogan et al. | Mar. 4, 1958 |
| 2,842,532 | Campbell | July 8, 1958 |
| 2,941,254 | Swerlick | June 21, 1960 |

FOREIGN PATENTS

| | | |
|---|---|---|
| 124,700 | Australia | July 10, 1947 |
| 1,130,334 | France | Sept. 24, 1956 |
| 569,043 | Great Britain | May 2, 1945 |